United States Patent
Takami et al.

(10) Patent No.: US 11,901,503 B2
(45) Date of Patent: Feb. 13, 2024

(54) COMPOSITE ELECTROLYTE, SECONDARY BATTERY, BATTERY PACK, AND VEHICLE

(71) Applicant: KABUSHIKI KAISHA TOSHIBA, Tokyo (JP)

(72) Inventors: Norio Takami, Yokohama Kanagawa (JP); Takashi Kishi, Yokosuka Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 159 days.

(21) Appl. No.: 17/007,131

(22) Filed: Aug. 31, 2020

(65) Prior Publication Data
US 2021/0296681 A1  Sep. 23, 2021

(30) Foreign Application Priority Data
Mar. 23, 2020  (JP) .................. 2020-050446

(51) Int. Cl.
| | | |
|---|---|---|
| *H01M 10/056* | (2010.01) | |
| *H01M 10/0525* | (2010.01) | |
| *H01M 10/42* | (2006.01) | |
| *B60L 50/64* | (2019.01) | |

(52) U.S. Cl.
CPC ........... *H01M 10/056* (2013.01); *B60L 50/64* (2019.02); *H01M 10/0525* (2013.01); *H01M 10/425* (2013.01); *H01M 2010/4271* (2013.01); *H01M 2220/20* (2013.01); *H01M 2300/0045* (2013.01); *H01M 2300/0068* (2013.01); *H01M 2300/0082* (2013.01); *H01M 2300/0091* (2013.01)

(58) Field of Classification Search
CPC ........... H01M 10/056; H01M 10/0525; H01M 10/425; H01M 2010/4241; H01M 2300/0045; H01M 2300/0068; H01M 2300/0082; H01M 2300/0091
See application file for complete search history.

(56) References Cited

U.S. PATENT DOCUMENTS

| | | | |
|---|---|---|---|
| 2012/0183836 A1 | 7/2012 | Harada | |
| 2013/0288112 A1* | 10/2013 | Ito ................... | H01M 10/056 429/188 |
| 2014/0363746 A1* | 12/2014 | He ................... | H01M 10/0569 429/188 |
| 2018/0083307 A1 | 3/2018 | Makino | |
| 2018/0241083 A1 | 8/2018 | Takami et al. | |
| 2019/0088926 A1* | 3/2019 | Takami ............. | H01M 50/44 |
| 2020/0220210 A1* | 7/2020 | Makino ............. | H01M 10/058 |

FOREIGN PATENT DOCUMENTS

| | | | | |
|---|---|---|---|---|
| CN | 108461819 A | * | 8/2018 | ............. B60L 50/64 |
| CN | 109119682 A | * | 1/2019 | ........ H01M 10/0525 |
| CN | 112242553 A | * | 1/2021 | |
| JP | 2011-119158 A | | 6/2011 | |
| JP | 2018-137097 A | | 8/2018 | |
| WO | WO2011/013254 A1 | | 2/2011 | |
| WO | WO-2016/199805 A1 | | 12/2016 | |
| WO | WO-2019/181943 A1 | | 9/2019 | |

* cited by examiner

*Primary Examiner* — Matthew J Merkling
(74) *Attorney, Agent, or Firm* — Foley & Lardner LLP

(57) ABSTRACT

According to one embodiment, a composite electrolyte includes inorganic solid particles, an ionic liquid and 0.5 to 10% by weight of a fibrous polymer. The ionic liquid includes cations and anions. The fibrous polymer has an average fiber diameter of 1 to 100 nm.

18 Claims, 8 Drawing Sheets

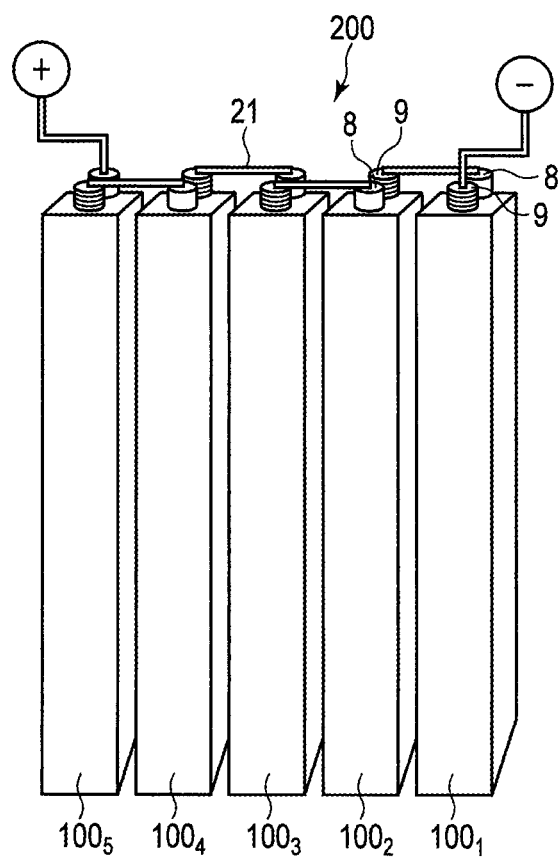
F I G. 6

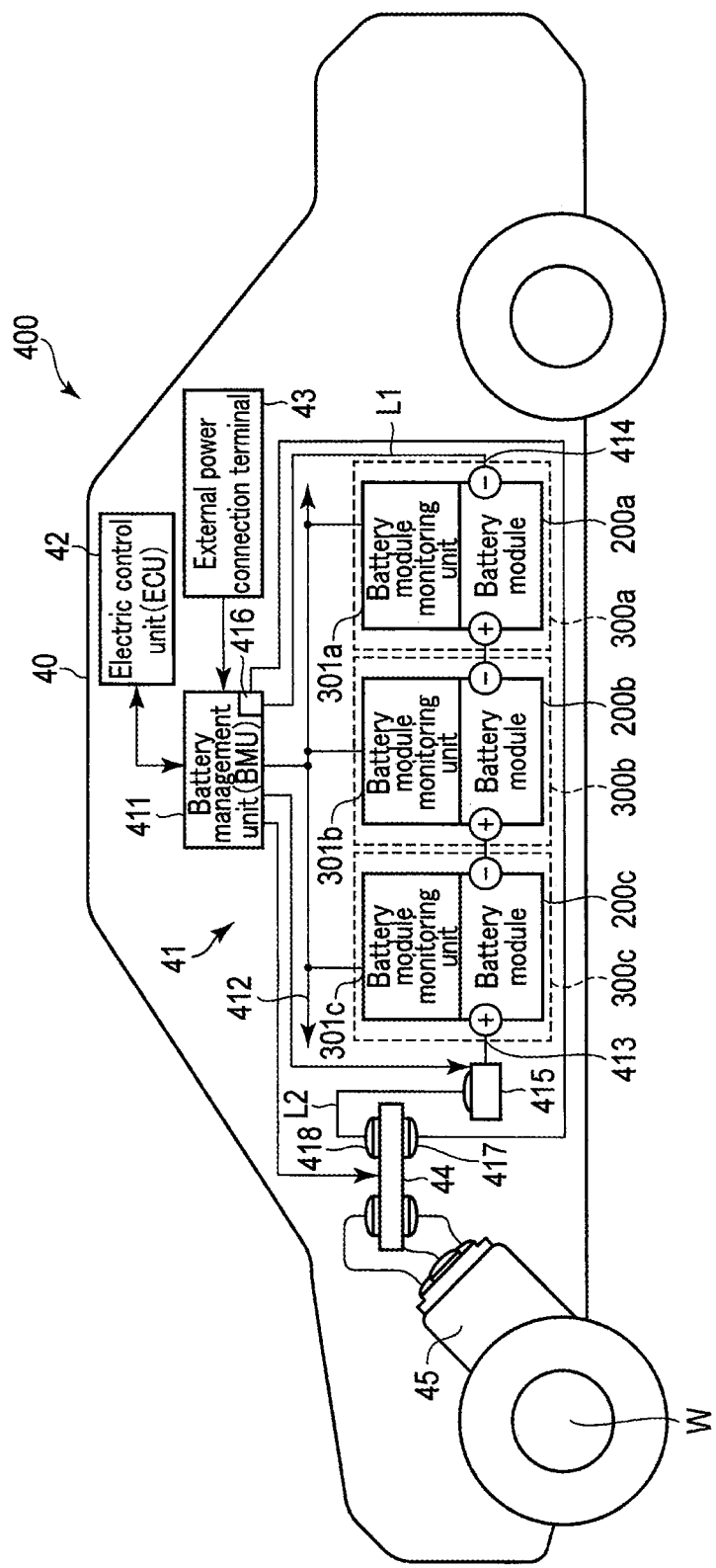
F I G. 10

COMPOSITE ELECTROLYTE, SECONDARY BATTERY, BATTERY PACK, AND VEHICLE

CROSS-REFERENCE TO RELATED APPLICATIONS

This application is based upon and claims the benefit of priority from Japanese Patent Application No. 2020-050446, filed Mar. 23, 2020, the entire contents of which are incorporated herein by reference.

FIELD

Embodiments of the present invention relate to a composite electrolyte, a secondary battery, a battery pack and a vehicle.

BACKGROUND

Nonaqueous electrolyte batteries using lithium metal, a lithium alloy, a lithium compound, or a carbonaceous material as their negative electrodes are expected to be high energy density batteries, and research and development thereon are actively promoted. A lithium-ion battery which includes: a positive electrode including $LiCoO_2$, $LiNi_{1/3}Co_{1/3}Mn_{1/3}O_2$, or $LiMn_2O_4$ as an active material; and a negative electrode including a carbonaceous material which allows lithium ions to be inserted in and to be extracted from has been widely put to practical use for portable devices so far.

In addition, in the negative electrode, metal oxides or alloys have been studied instead of carbonaceous materials. In particular, when mounted in a vehicle such as an automobile, the constituent material for the negative electrode is required to be excellent in chemical and electrochemical stability, strength, and corrosion resistance, from the viewpoint of the cycle performance in a high temperature environment, high-output long-term reliability, and safety. Furthermore, high performance in cold regions, specifically, high output performance or long life performance in a low-temperature environment may be required. On the other hand, solid electrolytes, and nonvolatile and non-flammable electrolyte solutions are being developed as electrolytes from the viewpoint of improving safety performance, but they are still not in practical use due to the deterioration in discharge rate performance, low-temperature performance, and long-life performance. Particularly in the development of all-solid-state secondary batteries, research and development to enhance the ionic conductivity of oxide solid electrolytes and sulfide solid electrolytes are in progress, but the ionic conduction resistance or reaction resistance inside the electrode and the interface resistance between the electrode and the solid electrolyte increase, so that the discharge performance and the low-temperature performance greatly deteriorate. Further, in the charge-and-discharge cycle, the resistance increases due to the disconnection of the ion conduction path in the electrode due to the expansion/contraction of the electrode, and the interface resistance between the electrode and the solid electrolyte increases due to the decrease in the bonding between the electrode and the solid electrolyte, so that the deterioration in cycle life performance and discharge rate performance becomes remarkable. Due to such problems, it is difficult to put an all-solid secondary battery using a solid electrolyte into practical use.

BRIEF DESCRIPTION OF THE DRAWINGS

FIG. 6 is a perspective view showing an example of a battery module including the secondary battery of the embodiment;

FIG. 10 is a view schematically showing another example of a vehicle according to the embodiment; and

DETAILED DESCRIPTION

Figure 1:
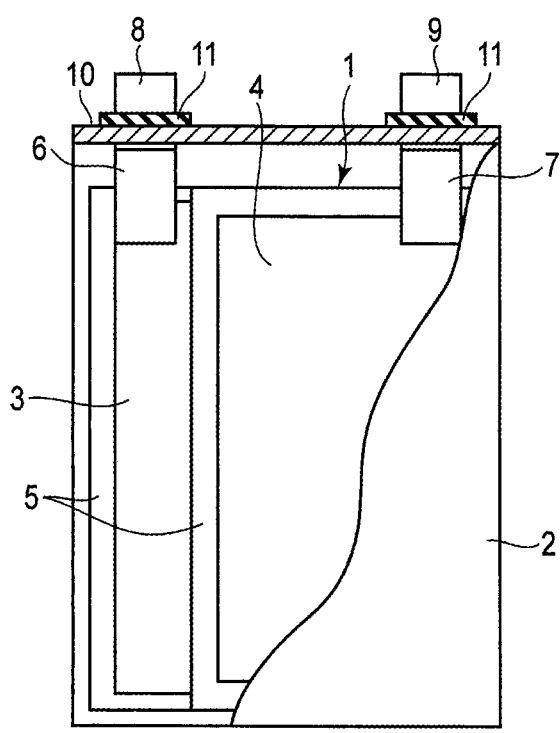
FIG. 1 is a partially cutaway cross-sectional view of a secondary battery of an embodiment.

According to one embodiment, a composite electrolyte includes inorganic solid particles, an ionic liquid and 0.5 to 10% by weight of a fibrous polymer. The ionic liquid includes cations and anions. The fibrous polymer has an average fiber diameter of 1 to 100 nm.

According to another embodiment, a secondary battery includes a positive electrode, a negative electrode, and the composite electrolyte according to the embodiment. The composite electrolyte is disposed between the positive electrode and the negative electrode.

According to another embodiment, a battery pack includes the secondary battery according to the embodiment.

According to another embodiment, a vehicle includes the battery pack according to the embodiment.

First Embodiment

According to the first embodiment, there is provided a composite electrolyte containing inorganic solid particles, an ionic liquid, and a fibrous polymer having an average fiber diameter of 1 to 100 nm. The ionic liquid includes cations and anions. The content of the fibrous polymer having an average fiber diameter of 1 to 100 nm in the composite electrolyte is in the range of 0.5 to 10% by weight.

The ionic liquid is often more viscous than the electrolyte solution. Therefore, it is difficult to composite the ionic liquid and the inorganic solid particles. As a result of intensive research, the present inventors have found that, when the content of the fibrous polymer having an average fiber diameter of 1 to 100 nm in the composite electrolyte is in the range of 0.5 to 10% by weight, the highly viscous ionic liquid uniformly permeates and wets the inorganic solid particles, and thus that the inorganic solid particles and the ionic liquid are composited with each other, leading to quasi-solidification of the composite electrolyte. The quasi-solidified composite electrolyte has a solid or gel state, is nonvolatile because it contains an ionic liquid, and has thermal stability. The ionic liquid disperses the inorganic solid particles uniformly, and thus the quasi-solidified composite electrolyte has high ionic conductivity. As a result, the composite electrolyte can have high adhesiveness to the electrode, and thus the electrode is prevented from being repeatedly expanded and contracted by charging and discharging, or the composite electrolyte is prevented from peeling from the electrode even when used in a high temperature environment. Moreover, the composite electrolyte is excellent in thermal stability and ionic conductivity. Therefore, an increase in interface resistance between the composite electrolyte and the electrode can be suppressed, so that the charge-and-discharge cycle life, discharge rate performance, and high-temperature storage performance of the secondary battery can be improved.

Hereinafter, the composite electrolyte will be described in detail.

The average particle size (diameter) of the inorganic solid particles is preferably 5 μm or less, more preferably 1 μm or less. By setting the average particle size within this range, the lithium ion conductivity is improved.

Examples of the inorganic solid particles include inorganic solid particles having no or low lithium ion conductivity, and lithium ion conductive inorganic solid particles. The type of the inorganic solid particles used can be one or two or more.

Examples of inorganic particles having no or low lithium ion conductivity include inorganic oxide particles that are free of Li such as $Al_2O_3$, $TiO_2$, $ZrO_2$ and $BaTiO_3$, e.g., lithium aluminum oxide (for example, $LiAlO_2$), and inorganic oxide particles that contain Li such as lithium silicon oxide and lithium zirconium oxide.

Examples of the lithium ion conductive inorganic solid particles include lithium ion-containing metal oxide particles, lithium ion-containing metal sulfide particles, lithium ion-containing metal halide particles, and lithium ion conductive inorganic solid electrolyte particles. In addition, the inorganic solid particles may be particles of an inorganic solid electrolyte.

Examples of the lithium ion conductive inorganic solid electrolyte include an oxide solid electrolyte having a garnet type structure and a lithium phosphoric acid solid electrolyte having a NASICON type structure.

The oxide solid electrolyte having a garnet type structure has advantages of high reduction resistance and a wide electrochemical window. Examples of the oxide solid electrolyte having a garnet type structure include $Li_{5+x}A_xLa_{3-x}M_2O_{12}$ (A is at least one selected from the group consisting of Ca, Sr and Ba, M is at least one selected from the group consisting of Nb and Ta, and 0≤x≤0.5), $Li_3M_{2-x}L_2O_{12}$ (M is at least one selected from the group consisting of Ta and Nb, L may contain Zr, and 0≤x≤0.5), $Li_{7-3x}Al_xLa_3Zr_3O_{12}$ (0≤x≤0.5), and $Li_7La_3Zr_2O_{12}$. Among them, $Li_{6.25}Al_{0.25}La_3Zr_3O_{12}$ and $Li_7La_3Zr_2O_{12}$ each have high ionic conductivity and electrochemical stability, and thus have excellent discharge performance and cycle life performance. Further, even if the oxide solid electrolyte having such a composition is made into fine particles of 1 μm or less to attain a specific surface area of 10 to 100 m²/g, there is an advantage that it is chemically stable against an ionic liquid. The preferable particle size (diameter) of the oxide solid electrolyte having a garnet type structure is 0.01 to 0.5 μm. Within this range, the ionic conductivity of the composite electrolyte is enhanced, so that the discharge performance or the low-temperature performance is improved. A more preferable range is 0.05 to 0.3 μm.

Examples of the lithium phosphoric acid solid electrolytes having a NASICON type structure include $LiM_2(PO_4)_3$ (M is one or more selected from the group consisting of Ti, Ca, Ge, Sr, Zr, Sn and Al), and $Li_{1+y}Al_xM_{2-x}(PO_4)_3$ (M is one or more selected from the group consisting of Ti, Ge, Sr, Zr, Sn and Ca, 0≤x≤1, and 0≤y≤1). The lithium phosphoric acid solid electrolyte with a NASICON type structure represented by $LiM_2(PO_4)_3$ has excellent water resistance. Further, even if these lithium phosphoric acid solid electrolytes are made into fine particles of 1 μm or less to attain a specific surface area of 10 to 100 m²/g, there is an advantage that they are chemically stable against an ionic liquid. $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ each have high ionic conductivity and high electrochemical stability, and thus have excellent discharge performance and cycle life performance, which are preferred. The preferable particle size (diameter) may be 0.01 to 1 μm. Within this range, the ionic conductivity of the composite electrolyte is enhanced, so that the discharge performance or the low-temperature performance is improved. A more preferable range is 0.05 to 0.6 μm.

The proportion (content) of the inorganic solid particles in the composite electrolyte is preferably 30 to 90% by weight. By setting the proportion to 30% by weight or more, it is possible to promote quasi-solidification. A non-quasi-solidified, for example, liquid or slurry composite electrolyte is retained by a separator. When the thickness of the separator is reduced, the strength of the separator decreases, which induces an internal short circuit and increases self-discharge. The quasi-solidified composite electrolyte has a sufficient shielding effect even if it is thin, and thus can suppress self-discharge. Further, by setting the proportion to 90% by weight or less, an increase in interface resistance between the composite electrolyte and the electrode can be suppressed, so that deterioration in discharge performance or low-temperature performance can be suppressed. A more preferable range of the proportion is 35% by weight or more and 60% by weight or less.

The ionic liquid includes cations and anions. The type of the ions constituting the ionic liquid can be one or two or more.

The cations include alkali metal ion and at least one selected from the group consisting of trialkylsulfonium ion, alkylimidazolium ion, and quaternary ammonium ion.

The anions include at least one selected from the group consisting of $PF_6^-$, $BF_4^-$, $[N(CF_3SO_2)_2]^-$ and $[N(FSO_2)_2]^-$. A more preferable anion is at least one selected from the group consisting of $[N(CF_3SO_2)_2]^-$ and $[N(FSO_2)_2]^-$.

The above-mentioned ionic liquid including cations and anions is nonvolatile, and has high thermal stability, a low melting point, and high ionic conductivity.

Examples of the cation alkali metal ion include lithium ions, sodium ions, and potassium ions. The alkali metal ion is preferably a lithium ion.

The lithium ion can be provided, for example, from a lithium salt. Examples of the lithium salt include $LiBF_4$, $LiPF_6$, $LiAsF_6$, $LiClO_4$, $LiCF_3SO_3$, $LiN(FSO_2)_2$, $LiN(CF_3SO_2)_2$, $LiN(C_2F_5SO_2)_2$, $Li(CF_3SO_2)_3C$, and $LiB[(OCO)_2]_2$. The type of the lithium salt used may be one or two or more. The amount of the lithium salt dissolved in the ionic liquid is preferably 0.1 mol/kg or more and 2 mol/kg or less.

The trialkylsulfonium ion has a skeleton represented by the following formula (1). Examples of the trialkylsulfonium ion include triethylsulfonium ions, trimethylsulfonium ions, and methylethylpropylsulfonium ions. Preferred are triethylsulfonium ions and methylethylpropylsulfonium ions having a low melting point and high ionic conductivity. Cellulose fiber, which is an example of fibrous polymers, is combined with an ionic liquid containing trialkylsulfonium ions as cations to promote quasi-solidification of the composite electrolyte.

[Chemical Formula 1]

The alkylimidazolium ion and the quaternary ammonium ion each have a skeleton represented by formula (2).

[Chemical Formula 2]

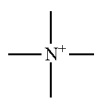

As the alkylimidazolium ion, dialkylimidazolium ion, trialkylimidazolium ion, tetraalkylimidazolium ion and the like are preferred. Among the dialkylimidazolium ions, 1-methyl-3-ethyl imidazolium ion (MEI$^+$) is preferred. As the trialkylimidazolium ion, 1,2-dimethyl-3-propylimidazolium ion (DMPI$^+$) is preferred. As the tetraalkylimidazolium ion, 1,2-diethyl-3,4(5)-dimethylimidazolium ion is preferred. Among the alkylimidazolium ions, 1-methyl-3-ethyl imidazolium ion (MEI$^+$) is preferred.

As the quaternary ammonium ion, tetraalkylammonium ion, cyclic ammonium ion and the like are preferred. Particularly, tetraalkylammonium ion is preferred. The tetraalkylammonium ion is preferably diethylmethylmethoxyethylammonium (DEME), dimethylethylmethoxyethylammonium ion, dimethylethylmethoxymethylammonium ion, dimethylethylethoxyethylammonium ion, or trimethylpropylammonium ion. By using alkylsulfonium ion, alkylimidazolium ion, or quaternary ammonium ion (particularly, tetraalkylammonium ion), the melting point can be 100° C. or lower, more preferably 20° C. or lower. Furthermore, the reactivity with the negative electrode can be lowered.

The ionic liquid is nonvolatile, has a low melting point, can have high ionic conductivity and high electrochemical stability, and can realize a secondary battery having excellent cycle life performance, high current performance, and thermal stability.

The content of the ionic liquid in the composite electrolyte is preferably 10 to 60% by weight. By setting the content to 10% by weight or more, the bonding between the composite electrolyte and the electrode becomes uniform, and the increase in electrode interface resistance can be suppressed. By setting the content to 60% by weight or less, the ionic liquid can be retained in the composite solid electrolyte with 10% by weight or less of the fibrous polymer. As a result, the resistance of the composite electrolyte can be lowered. Therefore, by setting the content of the ionic liquid to 10 to 60% by weight, the inorganic solid particles and the ionic liquid can be easily composited, so that the ionic conductivity of the composite electrolyte and the bondability between the composite electrolyte and the electrode can be enhanced. A more preferable range of the content of the ionic liquid in the composite electrolyte is 10% by weight or more and 50% by weight or less.

The fibrous polymer having an average fiber diameter of 1 to 100 nm is preferably cellulose fiber (e.g., cellulose nanofiber). The fibrous polymer having an average fiber diameter of 1 to 100 nm may have an aspect ratio (ratio of the average fiber diameter to the average fiber length) in the range of 100 to 10,000. Further, examples of the fibrous polymer satisfying the average fiber diameter and the aspect ratio include cellulose nanofiber. Cellulose nanofiber have an extremely large aspect ratio and can firmly retain a highly viscous ionic liquid in a space of fine mesh formed mainly of fibers. Therefore, the composite electrolyte can be quasi-solidified by incorporating 0.5 to 10% by weight of cellulose nanofiber in the composite electrolyte. In addition, the composite electrolyte containing cellulose nanofiber also enhances both of the bonding force between the composite electrolyte and the positive electrode and the bonding force between the composite electrolyte and the negative electrode, can suppress the disconnection of ionic conduction due to the expansion and contraction of the electrode, and can improve the cycle life performance and reduce the electrode resistance.

The composite electrolyte contains inorganic solid particles, an ionic liquid, and 10% by weight or less of a fibrous polymer having an average fiber diameter of 1 to 100 nm, whereby the quasi solidification of the composite electrolyte is promoted. Therefore, the adhesiveness to the electrode can be enhanced even without incorporation of a polymer such as a binder. Therefore, the composite electrolyte may contain no polymer other than the cellulose fiber. For example, the content of the polymer other than the cellulose fiber in the composite electrolyte can be set to almost 0%.

The composite electrolyte may contain an organic solvent. The content of the organic solvent in the composite electrolyte may be 5% by weight or less. Examples of the organic solvent include cyclic carbonates, chain carbonates, γ-butyrolactone (GBL), α-methyl-γ-butyrolactone (MBL), phosphoric acid esters, and fluorinated ethers. The type of the organic solvent used may be one or two or more.

Examples of cyclic carbonates include propylene carbonate (PC), ethylene carbonate (EC), vinylene carbonate (VC), and fluorinated cyclic carbonates (e.g., fluorinated ethylene carbonate).

Examples of chain carbonates include dimethyl carbonate (DMC), methyl ethyl carbonate (MEC), diethyl carbonate (DEC), and fluorinated chain carbonates (e.g., fluorinated ethyl methyl carbonate).

Examples of phosphoric acid esters include trimethyl phosphate (PO(OCH$_3$)$_3$), triethyl phosphate (PO(OC$_2$H$_5$)$_3$), and tripropyl phosphate (PO(OC$_4$H$_9$)$_3$).

By incorporating, in the composite electrolyte, one or more cyclic carbonates selected from the group consisting of propylene carbonate (PC), ethylene carbonate (EC) and vinylene carbonate (VC), or one or more chain carbonates selected from the group consisting of dimethyl carbonate (DMC), methyl ethyl carbonate (MEC) and diethyl carbonate (DEC), a film can be formed at the negative electrode interface, so that the cycle life performance of the secondary battery can be improved.

The incorporation of γ-butyrolactone and/or trimethyl phosphate in the composite electrolyte can suppress an increase in ionic conduction resistance in a low temperature environment and improve the discharge performance at low temperatures (e.g., −30° C. or lower).

The composite electrolyte can satisfy the required performance even without containing a binder, but may contain a binder. This can complement the flexibility and strength of the composite electrolyte. Examples of the binder include polyacrylonitrile (PAN), polyvinylidene fluoride (PVdF), polymethylmethacrylate, rubbers, and carboxymethylcellulose (CMC).

The content of the binder in the composite electrolyte can be in the range of 0.1 to 5% by weight. If it exceeds this range, the ionic conductivity of the electrolyte may be lowered so that the discharge performance may be lowered.

The composite electrolyte can be produced, for example, by the following procedure. A predetermined amount of the inorganic solid particles is added to the solvent in which the fibrous polymer is dispersed, these materials are stirred and mixed, and then the obtained mixture is heated to volatilize the solvent. As a result, the fibrous polymer is retained in the inorganic solid particles. The obtained inorganic solid particles containing the fibrous polymer are pulverized, dried, and then mixed with a predetermined amount of an ionic liquid in a dry environment to obtain a composite electrolyte. Alternatively, the inorganic solid particles and the fibrous polymer are mixed, and these materials are uniformly dispersed in a water solvent, and then the resulting aqueous solution is applied or sprayed on an electrode, dried, and pressed to form a film or layered product on the electrode surface. A composite electrolyte layer is obtained by impregnating the obtained film or layered product with the ionic liquid for quasi-solidification thereof.

The composite electrolyte may be in the form of a film or layer. The composite electrolyte may cover or contact the surface of at least one of the positive electrode and the negative electrode. The composite electrolyte preferably covers or contacts at least a part of the surface of a positive electrode active material-containing layer. It is desirable that at least a part of the surface of the positive electrode active material-containing layer facing a negative electrode active material-containing layer is covered or contacted with the composite electrolyte.

The thickness of the composite electrolyte layer can be set to 20 μm or less.

The physical properties and contents of the inorganic solid particles and the fibrous polymer are measured as follows.

The average particle size of the inorganic solid particles is measured by the following method. Using a laser diffraction type distribution measuring device (Shimadzu SALD-300 or a device with an equivalent function thereto), measurement is made by a method of firstly adding about 0.1 g of a sample, a surfactant and 1 to 2 mL of distilled water to a beaker and thoroughly stirring them, then pouring the mixture into a stirring water tank, measuring the luminous intensity distribution 64 times at two-second intervals, and analyzing grain size distribution data.

The BET specific surface area by $N_2$ adsorption of the inorganic solid particles is measured under the following conditions. Inorganic solid particles (1 g) are used as a sample. A BET specific surface area measuring device manufactured by Yuasa Ionics Inc. is used, and nitrogen gas is used as an adsorption gas.

The method for measuring the content of the inorganic solid particles in the composite electrolyte will be described below. TG (Thermogravimetry) measurement of the composite electrolyte up to 800° C. can be made to measure the content of the inorganic solid particles from the weight reduction of substances (for example, polymer) other than the inorganic solid particles.

The method for measuring the content of the fibrous polymer in the composite electrolyte will be described below. The composite electrolyte is pulverized using a mortar or the like, the obtained pulverized product is dispersed in water, and the fibrous polymer and inorganic solid particles are separated by utilizing the difference in specific gravity. The fibrous polymer in the supernatant is dried at 100° C. for 12 hours, the weight of the fibrous polymer is measured, and the content of the fibrous polymer in the composite electrolyte is determined.

The scanning electron microscope (SEM) is used to observe the fibrous polymer whose weight is measured by the above method at a magnification of 10000 times, thereby measuring the widths at positions of 25%, 50%, and 75% of the total length of the fibrous polymer in the visual field. The average of the measured width values is used as the average diameter to be determined. The measurement is made for all the fibrous polymer existing in the visual field.

The confirmation that the composite electrolyte is a gel is performed as follows. The gel state can be confirmed by applying a pressure of 10 g/cm$^2$ to the composite electrolyte and checking for the seepage of a liquid such as the ionic liquid.

When the composition of the composite electrolyte contained in the secondary battery, the physical properties of the inorganic solid particles, etc. are confirmed, the composite electrolyte is taken out from the secondary battery by the following method. The secondary battery is disassembled in a glove box filled with argon gas to take out the electrode. The composite electrolyte is peeled off from the taken-out electrode. Then, the composition of the composite electrolyte is confirmed.

The composite electrolyte of the first embodiment described above contains inorganic solid particles, an ionic liquid, and a fibrous polymer having an average fiber diameter of 1 to 100 nm, and the content of the fibrous polymer in the composite electrolyte is in the range of 0.5 to 10% by weight. Thus, it has excellent thermal stability and ionic conductivity. Further, the composite electrolyte has high adhesiveness to a substrate such as an electrode.

Second Embodiment

According to the second embodiment, there is provided a secondary battery including a positive electrode, a negative electrode, and the composite electrolyte according to the first embodiment, which is disposed between the positive electrode and the negative electrode. The secondary battery may further include any one of a separator, a container, a positive electrode terminal, and a negative electrode terminal.

Hereinafter, the positive electrode, the negative electrode, the separator, the container, the positive electrode terminal, and the negative electrode terminal will be described.

1. Positive Electrode

The positive electrode has a positive electrode current collector and a positive electrode active material-containing layer that is carried on one surface or both surfaces of the current collector and contains an active material, a conductive agent, and a binder.

Examples of the positive electrode current collector include a stainless steel foil, a nickel foil, a copper foil, titanium foil, an aluminum foil, and an aluminum alloy foil. As the aluminum foil, it is preferable to use an aluminum alloy foil having a purity of 99% or more, which includes pure aluminum (purity: 100%). The aluminum alloy is preferably an alloy containing, in addition to aluminum, one or more elements selected from the group consisting of iron, magnesium, zinc, manganese, and silicon. For example, Al—Fe alloys, Al—Mn-based alloys and Al—Mg-based alloys can provide higher strength than aluminum. On the other hand, the content of transition metals such as nickel or chromium in aluminum and aluminum alloys is preferably set to 100 ppm or less (including 0 ppm). For example, an Al—Cu-based alloy is unsuitable as a current collector because the strength increases but the corrosion resistance deteriorates. A more preferable aluminum purity is in the range of 99.99 to 99.0%. Within this range, deterioration in high-temperature cycle life due to dissolution of impurity elements can be reduced.

The thickness of the positive electrode current collector can be set to 20 μm or less, and is more preferably 15 μm or less.

Examples of the positive electrode active material include metal oxides, metal halides, and metal sulfides. As the metal oxide, preferred is at least one selected from the group consisting of lithium-manganese composite oxide, lithium-cobalt composite oxide, lithium-nickel composite oxide, lithium-nickel-cobalt composite oxide, lithium-cobalt-aluminum composite oxide, lithium-nickel-aluminum composite oxide, lithium-nickel-cobalt manganese composite oxide, lithium-manganese-nickel composite oxide having a spinel structure, and lithium-manganese cobalt composite oxide. Each of lithium-containing phosphate compounds having an olivine structure, fluorinated iron sulfate, $Li_xFe_{1-a}Mn_aSO_4F$ ($0<x\leq1$, $0\leq a<1$) having a tavorite structure is also preferred. As the metal halide, each of $CuCl_2$ and $CuF_2$, which has high voltage and high capacity, is preferred. As the metal sulfide, each of $FeS_2$, FeS, $TiS_2$, CuS, NiS and the like is preferred because of their high capacity. The type of the positive electrode active material used may be one or two or more.

Examples of the lithium-manganese composite oxide include $Li_xMn_2O_4$ ($0<x\leq1$) and $Li_xMnO_2$ ($0<x\leq1$).

Examples of the lithium-cobalt composite oxide include $Li_xCoO_2$ ($0<x\leq1$).

Examples of the lithium nickel aluminum composite oxide include $Li_xNi_{1-y}Al_yO_2$ ($0<x\leq1$, and $0<y\leq1$).

Examples of the lithium nickel cobalt composite oxide include $Li_xNi_{1-y-z}Co_yMn_zO_2$ ($0<x\leq1$, $0<y\leq1$, $0<z\leq1$, and $0<1-y-z<1$).

Examples of the lithium-manganese-cobalt composite oxide include $Li_xMn_yCo_{1-y}O_2$ ($0<x\leq1$, and $0<y<1$).

Examples of the lithium manganese nickel composite oxide having a spinel structure include $Li_xMn_{2-y}Ni_yO_4$ ($0<x\leq1$, and $0<y<2$).

Examples of the lithium-containing phosphate compound having an olivine structure include $Li_xFePO_4$ ($0<x\leq1$), $Li_xFe_{1-y}Mn_yPO_4$ ($0<x\leq1$, and $0<y\leq1$), $Li_xCoPO_4$ ($0<x\leq1$), and $Li_xMnPO_4$ ($0<x\leq1$).

Examples of the fluorinated iron sulfate include $Li_xFeSO_4F$ ($0<x\leq1$).

Examples of the lithium nickel cobalt manganese composite oxide include $Li_xNi_{1-y-z}Co_yMn_zO_2$ ($0<x\leq1.1$, $0<y\leq0.5$, $0<z\leq0.5$, and $0<1-y-z<1$).

According to the above positive electrode active material, a high positive electrode potential can be obtained. Among them, the lithium nickel aluminum composite oxide, each of the lithium nickel cobalt manganese composite oxide, and the lithium manganese cobalt composite oxide can suppress the reaction with a nonaqueous electrolyte in a high temperature environment, and significantly improve the battery life. Particularly, a lithium nickel cobalt manganese composite oxide represented by $Li_xNi_{1-y-z}Co_yMn_zO_2$ is preferred. By using the lithium nickel cobalt manganese composite oxide, a higher-temperature durable life can be obtained.

The positive electrode active material particles may be in the form of primary particles or secondary particles in which primary particles are aggregated. Further, primary particles and secondary particles may be mixed.

The average primary particle diameter of the positive electrode active material particles can be set to 0.05 μm or more and 5 μm or less, and a more preferable range thereof is 0.05 μm or more and 3 μm or less. The average secondary particle diameter of the positive electrode active material particles can be set to 3 μm or more and 20 μm or less.

The conductive agent can improve the electron conductivity of the positive electrode active material-containing layer and suppress the contact resistance with the current collector. Examples of the conductive agent can include acetylene black, carbon black, and graphite.

The binder can bind the active material and the conductive agent. Examples of the binder include polymers such as polytetrafluoroethylene (PTFE), polyvinylidene fluoride (PVdF), and fluororubber.

The positive electrode active material-containing layer may further contain a fibrous polymer having an average fiber diameter of 1 to 100 nm and inorganic solid particles having an average particle size of 1 μm or less in order to further enhance the ionic conductivity.

The fibrous polymer is preferably cellulose fiber (cellulose nanofiber). The fibrous polymer, when having a nano-sized fiber diameter with an average fiber diameter of 1 to 100 nm and a large aspect ratio of 100 to 10,000, can firmly retain the ionic liquid in the space of fine mesh formed mainly of fibers. In the positive electrode, it is possible to suppress disconnection of ionic conduction due to the expansion and contraction of the electrode active material, and also to improve the cycle life performance and reduce the electrode resistance.

Examples of the inorganic solid particles include particles of $Al_2O_3$, $TiO_2$, $ZrO_2$, and a phosphoric acid compound. The type of the inorganic solid particles used may be one or two or more. Examples of the phosphoric acid compound include $AlPO_4$, $Li_3PO_4$, and a lithium phosphoric acid compound with a NASICON type structure represented by $Li_{1+y}Al_xM_{2-x}(PO_4)_3$ (M is one or more selected from the group consisting of Ti, Ge, Sr, Zr, Sn and Ca, $0\leq x\leq1$, and $0\leq y\leq1$). More preferable phosphoric acid compound particles are a lithium phosphoric acid compound with a NASICON type structure represented by $Li_{1+y}Al_xM_{2-x}(PO_4)_3$ (M is one or more selected from Ti, Ge, Sr, Zr, Sn and Ca, $0\leq x\leq1$, and $0\leq y\leq1$) having high lithium ion conductivity. A more preferable average particle size of the inorganic solid particles is 0.05 to 0.6 μm. Within this range, the lithium ion conductivity in the positive electrode is improved, so the resistance of the positive electrode is reduced. By compositing the fibrous polymer and the inorganic solid particles, high-speed ion conductivity can be maintained even in an electrode (e.g., positive electrode) having large expansion and contraction. In particular, at the interface among the ionic liquid held in the space of fine mesh formed mainly from the fibrous polymer, the inorganic solid particles having an average particle size of 1 μm or less, and the high-potential positive electrode active material particles, it is considered that the lithium ion concentration which is not affected by the solvation is increased, so that high-speed lithium ion conduction is developed to reduce the ion conduction resistance in the electrode and the resistance at the positive electrode active material interface. As the ionic liquid and the inorganic solid particles, the same ones as described in connection with the composite electrolyte can be used.

The positive electrode active material-containing layer preferably contains positive electrode active material particles that allow lithium ions to be inserted in and to be extracted from, 0.5 to 5% by weight of a fibrous polymer, and 0.5 to 10% by weight of inorganic solid particles.

The blending ratio of the positive electrode active material, the conductive agent and the binder is preferably 80% by weight or more and 95% by weight or less for the positive electrode active material, 3% by weight or more and 18% by weight or less for the conductive agent, and 2% by weight or more and 7% by weight or less for the binder.

The positive electrode is produced, for example, by suspending a positive electrode active material, a conductive agent and a binder in a suitable solvent, applying the suspension to a positive electrode current collector, and drying and pressing it. The positive electrode pressing pressure is preferably in the range of 0.15 ton/mm to 0.3 ton/mm. Within this range, the adhesiveness (peel strength) between the positive electrode active material-containing layer and the positive electrode current collector such as a stainless steel foil or aluminum foil is enhanced, and the elongation rate of the positive electrode current collector foil is 20% or less, which is preferred. Moreover, it is preferable that the porous space of the positive electrode be filled with the composite electrolyte.

The type of the component contained in the positive electrode active material-containing layer such as the positive electrode active material, the binder or the conductive agent can be one or two or more.

2. Negative Electrode

The negative electrode includes a negative electrode current collector and a negative electrode active material-containing layer that is carried on one surface or both surfaces of the current collector and contains an active material, a conductive agent, and a binder.

Lithium ions can be inserted in and extracted from the negative electrode active material. The type of the negative electrode active material used may be one or two or more. Examples of the negative electrode active material include lithium metal, carbon materials, lithium alloy materials, metal oxides, and metal sulfides. Among them, it is preferred to select one or more titanium-containing oxides selected from the group consisting of titanium-containing oxides having a lithium ion insertion/extraction potential in the range of 1 to 3 V on the basis of Li potential, specifically, lithium titanium oxide, titanium oxide, niobium titanium oxide, and lithium sodium niobium titanium oxide. Examples of the lithium titanium oxide include lithium titanium oxide with a spinel structure represented by the general formula $Li_{4+x}Ti_5O_{12}$ (x is $-1 \leq x \leq 3$), lithium titanium oxide with a ramsdellite structure represented by $Li_{2+x}Ti_3O_7$, $Li_{1+x}Ti_2O_4$, $Li_{1.1+x}Ti_{1.8}O_4$, $Li_{1.07+x}Ti_{1.86}O_4$, and $Li_{x^-}TiO_2$ (x is $0 \leq x$). Examples of the titanium oxide include titanium oxide with a monoclinic structure represented by the general formula $Li_xTiO_2$ ($0 \leq x$), where $TiO_2(B)$ is a pre-charge structure, titanium oxide with a rutile structure, where $TiO_2$ is a pre-charge structure, and titanium oxide with an anatase structure where $TiO_2$ is a pre-charge structure. Niobium titanium oxide is represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo and Ta).

The lithium titanium oxide with a spinel structure represented by the general formula $Li_{4+x}Ti_5O_{12}$ has very little volume change. Further, niobium titanium oxide (for example, $TiNb_2O_7$) has a high capacity. By using at least one of these titanium-containing oxides, it is possible to use an aluminum-containing foil instead of the copper foil for the negative electrode current collector, thereby using the aluminum-containing foils as the positive and negative electrodes' current collector to realize weight reduction and cost reduction. Further, by using at least one of these titanium-containing oxides, it is advantageous for the electrode structure of a bipolar structure.

By using at least one negative electrode active material selected from the group consisting of lithium metal, carbon materials, lithium titanium oxide, titanium oxide and niobium titanium oxide as the negative electrode active material, a secondary battery having excellent charge-and-discharge cycle life, discharge rate performance, high-temperature storage performance and thermal stability can be provided. The negative electrode containing lithium metal as the negative electrode active material can suppress reductive decomposition of the ionic liquid and the composite electrolyte. Therefore, further improvement in high-temperature storage performance of the secondary battery can be expected.

The average particle size of the negative electrode active material particles can be set to 1 μm or less. However, if the average particle size is small, the particles tend to aggregate, and the electrolyte distribution may be biased toward the negative electrode, resulting in electrolyte depletion at the positive electrode. Therefore, the lower limit is desirably 0.001 μm. It is desirable that the negative electrode active material particles have an average particle size of 1 μm or less and a specific surface area by the BET method using $N_2$ adsorption of 3 to 100 $m^2/g$. Thus, the affinity of the negative electrode with the electrolyte can be further increased.

The average particle size of the negative electrode active material particles is measured by the following method. Using a laser diffraction type distribution measuring device (Shimadzu SALD-300 or a device with an equivalent function thereto), measurement is made by a method of firstly adding about 0.1 g of a sample, a surfactant and 1 to 2 mL of distilled water to a beaker and thoroughly stirring them, then pouring the mixture into a stirring water tank, measuring the luminous intensity distribution 64 times at two-second intervals, and analyzing grain size distribution data.

The negative electrode active material-containing layer may have a porous structure. It is preferable that the negative electrode active material-containing layer be porous and that the composite electrolyte be present in the porous layer. Thus, the ionic conductivity in the negative electrode can be enhanced. The composite electrolyte may contain an ionic liquid, a fibrous polymer having an average fiber diameter of 1 to 100 nm, and inorganic solid particles having an average particle size of 1 μm or less. Since the fibrous polymer is cellulose fiber (cellulose nanofiber), the electrode resistance can be reduced. The fibrous polymer, when having a nano-sized fiber diameter with an average fiber diameter of 1 to 100 nm and a large aspect ratio of 100 to 10,000, can firmly retain the ionic liquid in the fine mesh space including fibers. In the negative electrode, it is possible to suppress disconnection of ionic conduction due to expansion and contraction of the electrode active material, and also to realize improvement in cycle life performance and reduction in electrode resistance. As the ionic liquid and the inorganic solid particles, the same ones as described in connection with the composite electrolyte can be used.

The negative electrode current collector differs depending on the type of the negative electrode active material. When lithium metal or a carbon material (for example, graphite or hard carbon) is used as the negative electrode active material, a copper foil is used as the negative electrode current collector. When a metal compound having a lithium ion insertion potential of 0.4 V (vs. Li/Li+) or more is used in the negative electrode active material, the negative electrode current collector is desirably an aluminum foil or an aluminum alloy foil. The thickness of each of the aluminum foil and the aluminum alloy foil is 20 μm or less, more preferably 15 μm or less. The purity of the aluminum foil is preferably 99.99% or more. The aluminum alloy is preferably an alloy containing an element such as magnesium, zinc or silicon. On the other hand, the content of transition metals such as iron, copper, nickel and chromium in the aluminum alloy is preferably 100 ppm or less.

As the conductive agent, for example, a carbon material, aluminum powder, TiO, or the like can be used. Examples of the carbon material can include acetylene black, carbon black, carbon nanotubes, graphene, coke, carbon fibers, and graphite. More preferably, coke having an average particle size of 10 μm or less and a heat treatment temperature of 800° C. to 2000° C., carbon nanotubes, graphene and graphite powder and carbon fibers having an average fiber diameter of 1 μm or less are preferred. The BET specific surface area by $N_2$ adsorption of the carbon material is preferably 10 $m^2$/g or more.

Examples of the binder include polytetrafluoroethylene (PTFE), polyvinylidene fluoride (PVdF), fluorine rubber, styrene butadiene rubber, and core shell binder.

The type of the component contained in the negative electrode active material-containing layer such as the negative electrode active material, the binder or the conductive agent can be one or two or more.

The blending ratio of the negative electrode active material, the conductive agent and the binder is preferably 80 to 95% by weight for the negative electrode active material, 3 to 18% by weight for the conductive agent, and 2 to 7% by weight for the binder.

The negative electrode is produced by suspending a negative electrode active material, a conductive agent and a binder in an appropriate solvent, applying the suspension to a current collector, drying it, and pressing, for example, warm-pressing it. Further, it is preferable that the negative electrode can have a porous structure, and that the porous space portion be filled with the composite electrolyte.

3. Separator

The separator may be disposed between the positive electrode and the negative electrode. The separator is desirably in contact with or integrated with the composite electrolyte. The thickness of the separator can be set to 12 μm or less. Examples of the separator include synthetic resin nonwoven fabrics, polyethylene porous films, polypropylene porous films, and cellulose nonwoven fabrics.

The separator may have a strip shape or a flat plate shape having a first main surface and a second main surface located on the back side of the first main surface. The composite electrolyte may be in contact with or integrated with at least a part of at least one of the first main surface and the second main surface.

4. Container

A metal container or a laminated film container can be used as the container (exterior container) in which the positive electrode, the negative electrode, and the composite electrolyte are housed.

As the metal container, a metal can made of aluminum, an aluminum alloy, iron, stainless steel or the like and having a rectangular or cylindrical shape can be used. The plate thickness of the container is desirably 0.5 mm or less, more preferably 0.3 mm or less.

Examples of the laminate film include a multilayer film in which an aluminum foil is covered with a resin film. As the resin, polymers such as polypropylene (PP), polyethylene (PE), nylon and polyethylene terephthalate (PET) can be used. The thickness of the laminated film is preferably 0.2 mm or less. The purity of the aluminum foil is preferably 99.5% or more.

The metal can made of an aluminum alloy is preferably made of an alloy containing elements such as manganese, magnesium, zinc and silicon and having an aluminum purity of 99.8% or less. The strength of the metal can made of an aluminum alloy is dramatically increased, so that the thickness of the can can be reduced. As a result, it is possible to realize a thin battery that is lightweight, has high output; and has excellent heat dissipation.

5. Negative Electrode Terminal

The negative electrode terminal can be formed of a material that is electrochemically stable at the Li insertion/extraction potential of the negative electrode active material and has conductivity. Specifically, the material for the negative electrode terminal includes copper, nickel, stainless steel, aluminum, and an aluminum alloy containing at least one element selected from the group consisting of Mg, Ti, Zn, Mn, Fe, Cu, and Si. Aluminum or an aluminum alloy is preferably used as the material for the negative electrode terminal. The negative electrode terminal is preferably made of the same material as the negative electrode current collector in order to reduce the contact resistance with the negative electrode current collector.

6. Positive Electrode Terminal

The positive electrode terminal can be formed of a conductive material that is electrically stable in the potential range (vs. Li/Li$^+$) of 3 V or more and 4.5 V or less with respect to the redox potential of lithium. Examples of the material for the positive electrode terminal include stainless steel, nickel, aluminum, and an aluminum alloy containing at least one element selected from the group consisting of Mg, Ti, Zn, Mn, Fe, Cu and Si. The positive electrode terminal is preferably formed of the same material as the positive electrode current collector in order to reduce the contact resistance with the positive electrode current collector.

The secondary battery according to the embodiment can be applied to various types of secondary batteries such as a rectangular type, a cylindrical type, a flat type, a thin type, and a coin type. Further, the secondary battery is preferably a secondary battery having a bipolar structure. This structure has an advantage that a single secondary battery can have a voltage equivalent to that of a plurality of cells in series. Moreover, since the short circuit of the electrolyte solution in the cell is prevented by using the composite electrolyte, a bipolar cell can be obtained.

An example of the secondary battery according to the embodiment will be described with reference to FIGS. 1, 2, 3, 4, and 5.

Figure 2:
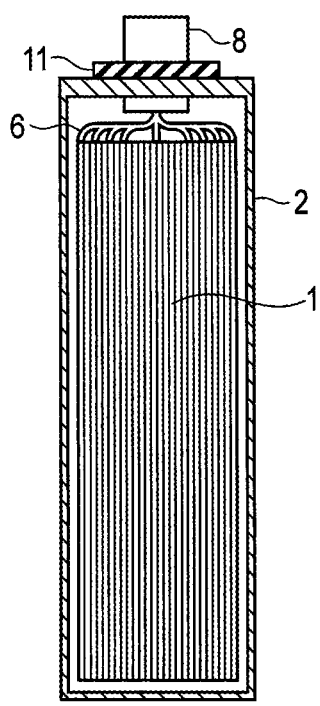
FIG. 2 is a side view of the battery of FIG. 1.

FIGS. 1 and 2 show an example of the secondary battery using a metal container.

An electrode group 1 is stored in a rectangular tubular metal container 2. The electrode group 1 has a structure formed by spirally winding the positive electrode active material-containing layer of a positive electrode 3 and the negative electrode active material-containing layer of a negative electrode 4 with a composite electrolyte layer 5 interposing therebetween so as to form a flat shape. The composite electrolyte layer 5 covers the surface (principal surface) of the positive electrode active material-containing layer or negative electrode active material-containing layer. As shown in FIG. 2, a strip-shaped positive electrode lead 6 is electrically connected to each of a plurality of portions at an end of the positive electrode 3 located on an end face of the electrode group 1. A strip-shaped negative electrode lead 7 is electrically connected to each of a plurality of portions at an end of the negative electrode 4 located on the end face. The plurality of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner circumference surface of each outlet hole of the sealing plate 10 is covered with an insulating member 11 to avoid a short circuit caused by contact between the positive electrode tab 8 and the negative electrode tab 9.

Figure 3:
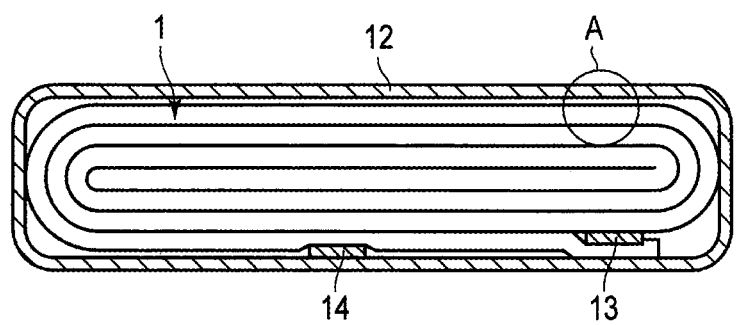
FIG. 3 is a cross-sectional view cutting the secondary battery of the embodiment in a direction perpendicular to an extending direction of a terminal.
Figure 4:
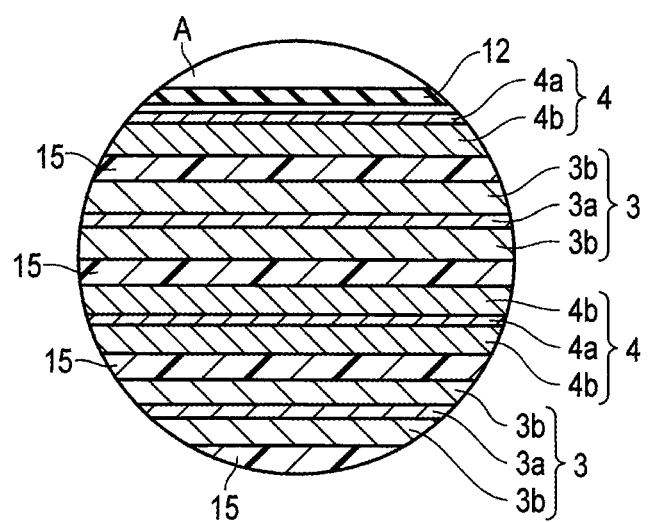
FIG. 4 is an enlarged cross-sectional view of the part A of FIG. 3.

FIGS. 3 and 4 show an example of a secondary battery using a container member made of a laminated film.

As shown in FIGS. 3 and 4, the flat wound electrode group 1 is stored in a sack-shaped container 12 made of a laminated film including a metal layer interposing between two resin films. The flat wound electrode group 1 is formed by spirally winding a stacked structure obtained by stacking the negative electrode 4, a composite electrolyte layer 15, the positive electrode 3, and the composite electrolyte layer 15 from the outside, and pressing the wound structure. The composite electrolyte layer 15 covers the surface (principal surface) of the positive electrode active material-containing layer or negative electrode active material-containing layer. The outermost negative electrode 4 has an arrangement in which a negative electrode layer (negative electrode active material-containing layer) 4*b* containing a negative electrode active material on one surface on the inner side of a negative electrode current collector 4*a*, as shown in FIG. 4, and the remaining negative electrodes 4 are arranged by forming the negative electrode layers 4*b* on both surfaces of the negative electrode current collector 4*a*. The positive electrode 3 is arranged by forming positive electrode layers (positive electrode active material-containing layers) 3*b* on both surfaces of a positive electrode current collector 3*a*.

Near the outer end of the wound electrode group 1, a negative electrode terminal 13 is electrically connected to the negative electrode current collector 4*a* of the outermost negative electrode 4, and a positive electrode terminal 14 is electrically connected to the positive electrode current collector 3*a* of the positive electrode 3 on the inner side. The negative electrode terminal 13 and the positive electrode terminal 14 extend outward from the opening portion of the sack-shaped container 12. The opening portion of the sack-shaped container 12 is heat-sealed, thereby sealing the wound electrode group 1. At the time of heat-sealing, the negative electrode terminal 13 and the positive electrode terminal 14 are sandwiched by the sack-shaped container 12 in the opening portion.

A separator may be used in addition to the composite electrolyte layers 5 and 15.

Next, a secondary battery having a bipolar structure will be described. The secondary battery further includes a current collector having a first surface and a second surface opposite to the first surface. The current collector can be the same as the positive electrode current collector or negative electrode current collector of the secondary battery. The secondary battery has a bipolar structure in which the positive electrode active material-containing layer is formed on the first surface of the current collector and the negative electrode active material-containing layer is formed on the second surface. The composite electrolyte layer is present on at least one surface of the positive electrode active material-containing layer and the negative electrode active material-containing layer. As a result, at least a part of the composite electrolyte layer is located between the positive electrode active material-containing layer and the negative electrode active material-containing layer. As the positive electrode active material-containing layer and the negative electrode active material-containing layer, the same ones as described in connection with the secondary battery can be used.

Figure 5:
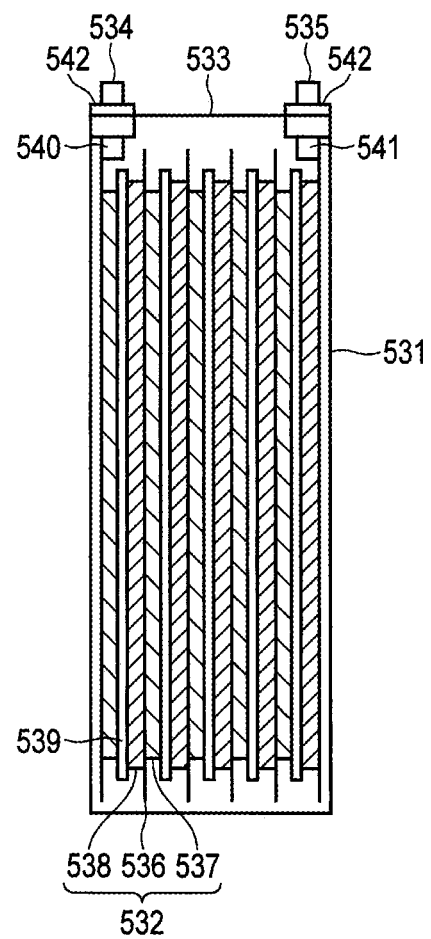
FIG. 5 is a cross-sectional view showing another example of the secondary battery according to the embodiment.

FIG. 5 shows an example of a bipolar secondary battery. The secondary battery shown in FIG. 5 includes a metal container 531, an electrode body 532 having a bipolar structure, a sealing plate 533, a positive electrode terminal 534, and a negative electrode terminal 535. The metal container 531 has a bottomed square tubular shape. As the metal container, a metal container similar to that described above is usable. The electrode body 532 having the bipolar structure includes a current collector 536, a positive electrode active material-containing layer 537 stacked on one surface (first surface) of the current collector 536, and a negative electrode active material-containing layer 538 stacked on the other surface (second surface) of the current collector 536. A composite electrolyte layer 539 is arranged between the electrode bodies 532 each having the bipolar structure. The positive electrode terminal 534 and the negative electrode terminal 535 are fixed to the sealing plate 533 via an insulating member 542. One end of a positive electrode lead 540 is electrically connected to the positive electrode terminal 534 and the other end is electrically connected to the current collector 536. One end of a negative electrode lead 541 is electrically connected to the negative electrode terminal 535 and the other end is electrically connected to the current collector 536.

The secondary battery according to the second embodiment described above includes the composite electrolyte according to the first embodiment, and thus can realize excellent charge-and-discharge cycle life, discharge rate performance, and high-temperature storage performance.

Third Embodiment

A battery module of the third embodiment includes a plurality of the secondary batteries according to the first embodiment.

Examples of the battery module include those including a plurality of unit cells electrically connected in series and/or in parallel as a constituent unit, and those including a first unit including a plurality of unit cells electrically connected in series or a second unit including a plurality of unit cells electrically connected in parallel. The battery module may include at least one of these configurations.

Examples of the form in which a plurality of secondary batteries are electrically connected in series and/or in parallel include those in which a plurality of batteries each having a container member are electrically connected in series and/or in parallel, and those in which a plurality of electrode groups or bipolar type electrode bodies housed in a common housing are electrically connected in series and/or in parallel. In a specific example of the former, the positive electrode terminals and the negative electrode terminals of a plurality of secondary batteries are connected by a metal bus bar (e.g., aluminum, nickel, copper). In a specific example of the latter, a plurality of electrode groups or bipolar type electrode bodies are housed in a single housing in a state of being electrochemically insulated by partition walls, and are electrically connected in series. In the case of secondary batteries, the number of batteries to be electrically connected in series is set within the range of 5 to 7, so that the voltage compatibility with lead storage batteries is improved. In order to improve the voltage compatibility with the lead storage batteries, it is preferable to connect five or six unit cells in series.

A metal can made of an aluminum alloy, iron, stainless steel or the like, a plastic container, or the like can be used for the housing that houses the battery module. Further, the plate thickness of the container is desirably 0.5 mm or more.

An example of a battery module will be described with reference to FIG. 6. A battery module 200 shown in FIG. 6 includes, as single batteries, a plurality of rectangular secondary batteries $100_1$ to $100_5$ shown in FIG. 1. A positive electrode tab 8 of the battery $100_1$ and a negative electrode tab 9 of the battery $100_2$ located adjacent to the battery $100_1$ are electrically connected by a lead or bus bar 21. In addition, a positive electrode tab 8 of the battery $100_2$ and a negative electrode tab 9 of the battery $100_3$ located adjacent to the battery $100_2$ are electrically connected by a lead or bus bar 21. The batteries $100_1$ to $100_5$ are thus electrically connected in series.

The battery module according to the third embodiment described above includes the secondary battery of the second embodiment, and thus can realize excellent charge-and-discharge cycle life, discharge rate performance, and high-temperature storage performance.

Fourth Embodiment

A battery pack according to the fourth embodiment can include one or more secondary batteries (unit cells) according to the second embodiment. A plurality of secondary batteries may be electrically connected in series, in parallel, or in a combination of series and parallel to constitute a battery module. The battery pack according to the fourth embodiment may include a plurality of battery modules.

The battery pack according to the fourth embodiment may further include a protective circuit. The protective circuit has a function of controlling charge/discharge of the secondary battery. Alternatively, a circuit included in a device that uses the battery pack as a power source (for example, an electronic device, an automobile, etc.) can be used as the protective circuit for the battery pack.

Moreover, the battery pack according to the fourth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 7:
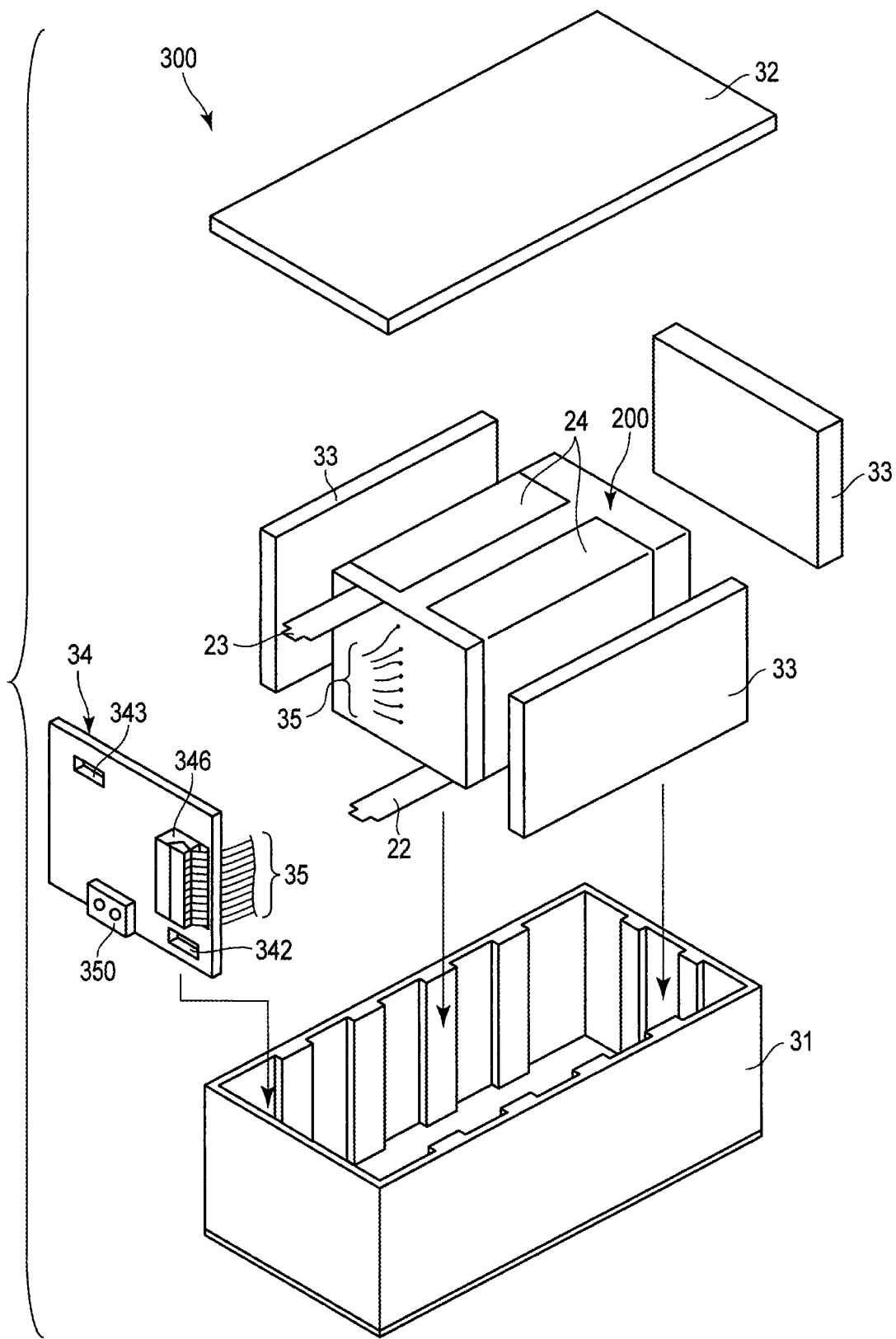
FIG. 7 is an exploded perspective view of a battery pack of the embodiment.
Figure 8:
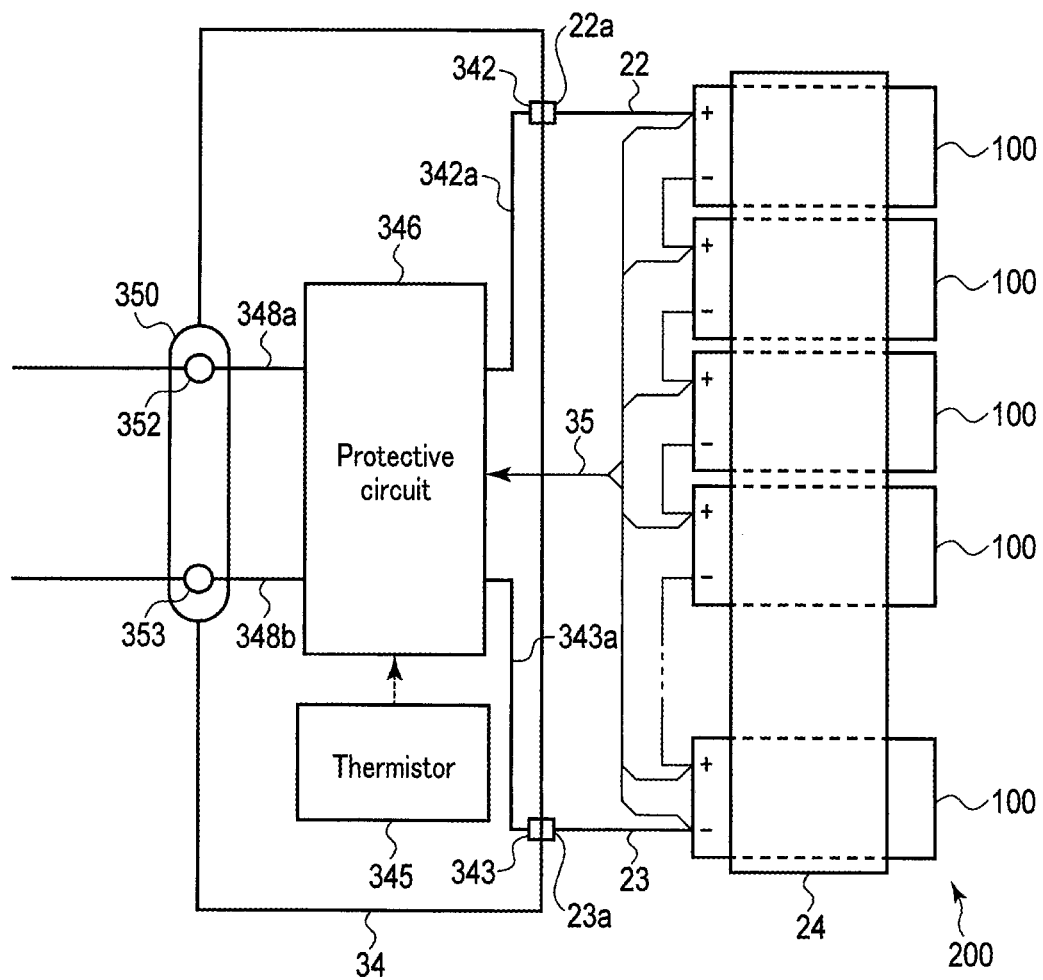
FIG. 8 is a block diagram showing an electric circuit of the battery pack of FIG. 7.

FIG. 7 is an exploded perspective view schematically showing an example of the battery pack according to the fourth embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

The housing container 31 shown in FIG. 7 is a square-bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a battery according to the first embodiment. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode(s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side (positive-side) wiring 348a, and a minus-side (negative-side) wiring 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode-side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery 100. When detecting over charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may not be needed. In this case, the positive electrode-side lead 22 and the negative electrode-side lead 23 may respectively be used as the positive-side terminal and negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles and railway cars. An example of the electronic device is a digital camera. The battery pack is particularly favorably used as an onboard battery.

The battery pack according to the fourth embodiment includes the secondary battery according to the second embodiment or the battery module according to the third embodiment. Therefore, a battery pack having excellent cycle life performance, discharge rate performance, and high-temperature storage performance can be realized.

Fifth Embodiment

According to a fifth embodiment, a vehicle is provided. This vehicle is mounted with the battery pack according to the fourth embodiment.

In the vehicle according to the fifth embodiment, the battery pack is intended, for example, for recovering regenerative energy of power of the vehicle. The vehicle may include a mechanism (for example, a regenerator) that converts kinetic energy of the vehicle into regenerative energy.

Examples of the vehicle according to the fifth embodiment include two-wheel to four-wheel hybrid electric automobiles, two-wheel to four-wheel electric automobiles, assisted bicycles, and railway vehicles.

The mounting position of the battery pack in the vehicle according to the fifth embodiment is not particularly limited. For example, when the battery pack is mounted in an automobile, the battery pack can be mounted in the engine room of the vehicle, behind the vehicle body, or under the seat.

The vehicle according to the fifth embodiment may be mounted with a plurality of battery packs. In this case, the batteries included in the respective battery packs may be electrically connected in series, may be electrically connected in parallel, or may be electrically connected in a combination of series and parallel. For example, when each of the battery packs includes a battery module, the battery modules may be electrically connected in series, may be electrically connected in parallel, or may be electrically connected in a combination of series and parallel. Alternatively, when each of the battery packs includes a single battery, the respective batteries may be electrically connected in series, may be electrically connected in parallel, or may be electrically connected in a combination of series and parallel.

An example of the vehicle according to the fifth embodiment is explained below, with reference to the drawings.

Figure 9:
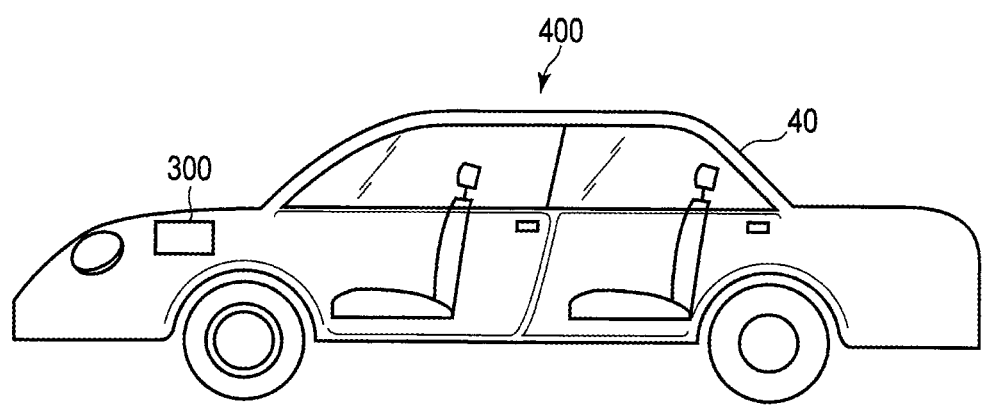
FIG. 9 is a schematic drawing showing an example of a vehicle including the secondary battery of the embodiment.

FIG. 9 is a partially see-through diagram schematically showing an example of a vehicle according to the fifth embodiment.

A vehicle 400, shown in FIG. 9 includes a vehicle body 40 and a battery pack 300 according to the third embodiment. In the example shown in FIG. 9, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 9, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 10, an aspect of operation of the vehicle according to the fifth embodiment is explained.

FIG. 10 is a diagram schematically showing an example of a control system related to an electric system in the vehicle according to the fifth embodiment. A vehicle 400, shown in FIG. 10, is an electric automobile.

The vehicle 400, shown in FIG. 10, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 10, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN(Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 10) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism (i.e., a regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line Li is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fifth embodiment includes the battery pack according to the fourth embodiment. Therefore, it is possible to realize a vehicle having excellent traveling performance in a wide temperature range from low temperature to high temperature.

EXAMPLES

Hereinafter, examples of the present invention will be described in detail with reference to the drawings, but the present invention is not limited to the examples which will be described below.

Example 1

For positive electrode active material particles, $LiNi_{0.8}Co_{0.1}Mn_{0.1}O_2$ having an average particle size of 5 μm was used. In the particles, 2% by weight of $Li_{1.3}Al_{0.3}Zr_{1.7}(PO_4)_3$ particles with a NASICON type structure having an average particle size of 0.4 μm as an inorganic solid powder, 1% by weight of cellulose nanofiber having an average fiber diameter of 10 nm and an aspect ratio of 500, 5% by weight of graphite powder as a conductive agent, and 3% by weight of PVdF as a binder were blended. These were dispersed in a solvent of n-methylpyrrolidone (NMP) to prepare a slurry, and then the slurry was applied to both surfaces of a stainless steel foil (SUS304) having a thickness of 15 μm, dried, and subjected to a pressing step, to produce a positive electrode having an electrode density of 3.1 g/cm$^3$.

As the negative electrode active material particles, $TiNb_2O_7$ particles having an average particle size of 0.9 μm and a specific surface area of 4 m$^2$/g were prepared. The negative electrode active material particles, graphite powder having an average particle size of 6 μm as a conductive agent, styrene-butadiene rubber and carboxymethyl cellulose (CMC) as binders, $Li_{1.3}Al_{0.3}Zr_{1.7}(PO_4)_3$ particles, and cellulose nanofiber having an average fiber diameter of 10 nm and an aspect ratio of 500 were blended in a weight ratio of 90:5:2:1.9:1:0.1. These were dispersed in water, and stirring was performed in a ball mill under conditions of a rotation speed of 1000 rpm and a stirring time of 1 hour to prepare a slurry. The resulting slurry was applied to both surfaces of a 15 μm-thick aluminum alloy foil (purity: 99.3%), dried, and subjected to a heat pressing step to produce a negative electrode having a negative electrode active material-containing layer on its one surface, the negative electrode having an electrode density of 2.7 g/cm$^3$. The porosity of the negative electrode excluding the current collector was 35%.

A composite electrolyte layer was produced as an electrolyte. In an ionic liquid containing triethylsulfonium ions $(S(C_2H_5)_3^+)$ and $[N(CF_3SO_2)_2]^-$ ions, 0.2 mol/kg of $Li[N(CF_3SO_2)_2]$ and 0.05 mol/kg of $LiPF_6$ were dissolved as lithium salts to obtain an ionic liquid containing lithium ions. $Li_{1.3}Al_{0.3}Zr_{1.7}(PO_4)_3$ particles with a NASICON type structure having an average particle size (diameter) of 1 μm, the ionic liquid containing lithium ions, and cellulose nanofiber having an average diameter of 10 nm and an aspect ratio of 500 were blended in predetermined amounts in a weight ratio of 55:40:5, so that these were composited. Specifically, $Li_{1.3}Al_{0.3}Zr_{1.7}(PO_4)_3$ particles and cellulose nanofiber were mixed and uniformly dispersed in a water solvent, and the resulting aqueous solution was then applied to the surface of the positive electrode active material-containing layer, dried and pressed to form a layered product on the surface of the positive electrode active material-containing layer. The obtained layered product was impregnated with the ionic liquid to be quasi-solidified, thereby obtaining a composite electrolyte layer having a thickness of 10 μm. The obtained composite electrolyte layer contains no polymer other than the cellulose fiber.

As the separator, a cellulose nonwoven fabric having a thickness of 8 μm was used.

The negative electrode, the separator, the composite electrolyte layer, and the positive electrode were disposed so that one surface of the separator was in contact with the composite electrolyte layer on the surface of the positive electrode active material-containing layer and the other surface of the separator was in contact with the surface of the negative electrode active material-containing layer to produce a laminated electrode group. This electrode group was housed in a container made of a thin metal can made of an aluminum alloy (Al purity: 99%) having a thickness of 0.25 mm.

An ionic liquid of $S(C_2H_5)_3[N(CF_3SO_2)_2]$ in which 0.2 mol/kg of $Li[N(CF_3SO_2)_2]$ was dissolved was allowed to permeate the voids of the positive electrode and the negative electrode. A rectangular nonaqueous electrolyte secondary battery having the structure shown in FIG. 1 and having a thickness of 13 mm, a width of 62 mm and a height of 96 mm was produced.

Examples 2 to 17

A secondary battery was produced in the same manner as in Example 1 except that a negative electrode active material having the composition shown in Table 1 below, inorganic solid particles having the composition and content rate shown in Table 2, an ionic liquid having the composition and content rate shown in Table 2, an organic solvent having the composition and content rate shown in Table 2, and a fibrous polymer having the fiber diameter and content rate shown in Table 2 were used.

VC(1) in Table 2 shows that 1% by weight of vinylene carbonate is contained in the composite electrolyte. The aspect ratio of the cellulose nanofiber having a fiber diameter of 80 nm was 600, and the aspect ratio of the cellulose nanofiber having a fiber diameter of 1 nm was 1000. MEI denotes 1-methyl-3-ethylimidazolium and DEME denotes diethylmethylmethoxyethylammonium.

Comparative Examples 1 to 8

A secondary battery was produced in the same manner as in Example 1 except that a negative electrode active material having the composition shown in Table 3 below, inorganic solid particles having the composition and content rate shown in Table 4, an ionic liquid having the composition and content rate shown in Table 4, and a fibrous polymer having the fiber diameter and content rate shown in Table 4 were used.

In Comparative Examples 3, 5, and 6, an organic electrolyte solution (nonaqueous electrolyte solution) was used instead of the composite electrolyte. The separator impregnated with the organic electrolyte solution was disposed between the positive electrode and the negative electrode. The same separator as that described in Example 1 was used. The organic electrolyte solutions of Comparative Examples 3 and 6 are prepared by dissolving 1 mol/L of $LiPF_G$ in an organic solvent in which propylene carbonate (PC) and diethyl carbonate (DEC) are mixed in a volume ratio of 1:2. The organic electrolyte solution of Comparative Example 5 is prepared by dissolving 1 mol/L of $LiPF_6$ in a mixed solvent obtained by adding 1% by weight of vinylene carbonate (VC) to 99% by weight of an organic solvent in which ethylene carbonate (EC) and diethyl carbonate (DEC) are mixed in a volume ratio of 1:2.

The obtained secondary batteries of Examples 1 to 15 and Comparative Examples 1 to 4, 7, and 8 were charged to 2.9 V with a constant current of 1 C (6 A) at 25° C., and then charged at a constant voltage of 2.9 V. After the charging was terminated at the time point when the current converged to 0.05 A, the discharge capacity when discharging was performed at 6 A up to 1.5 V was measured to obtain the discharge capacity at 25° C. The capacity retention ratio after repeating the charge-and-discharge cycle 1000 times under these conditions was measured with the first cycle as 100%. As the high current discharge performance, the 5 C discharge capacity was measured by discharging at 5 C (30 A) up to 1.5 V after charging under the above conditions. In addition, the 0.2 C discharge capacity was measured by charging under the above conditions and then discharging at 0.2 C (1.2 A) up to 1.5 V. The 5 C discharge capacity when the 0.2 C discharge capacity was defined as 100% was determined as the 5 C discharge capacity retention ratio. Further, after the charging was completed under the above conditions, the thickness of the battery after being stored at 80° C. for 100 hours was measured.

The secondary batteries of Examples 16 and 17 and Comparative Examples 5 and 6 were charged to 4.1 V with a constant current of 1 C (6 A) at 25° C., and then charged at a constant voltage of 4.1 V. After the charging was terminated at the time point when the current converged to 0.05 A, the discharge capacity when discharging was performed at 6 A up to 3.0 V was measured to obtain the discharge capacity at 25° C. The capacity retention ratio after repeating the charge-and-discharge cycle 1000 times under these conditions was measured with the first cycle as 100%. As the high current discharge performance, the 5 C discharge capacity was measured by discharging at 5 C (30 A) up to 3.0 V after charging under the above conditions. Also, the 0.2 C discharge capacity was measured by discharging at 0.2 C (1.2 A) up to 3.0 V after charging under the above conditions. The 5 C discharge capacity when the 0.2 C discharge capacity was defined as 100% was determined as the 5 C discharge capacity retention ratio. Further, after the charging was completed under the above conditions, the thickness of the battery after being stored at 80° C. for 100 hours was measured.

The measurement results are shown in Tables 5 and 6 below.

TABLE 1

| | Negative active material electrode | Composite electrolyte Inorganic solid particles | Content rate (% weight) |
|---|---|---|---|
| Example 1 | $TiNb_2O_7$ | $Li_{1.3}Al_{0.3}Zr_{1.7}(PO_4)_3$ | 55 |
| Example 2 | $TiNb_2O_7$ | $Li_{1.3}Al_{0.3}Zr_{1.7}(PO_4)_3$ | 79 |
| Example 3 | $TiNb_2O_7$ | $Li_{1.3}Al_{0.3}Zr_{1.7}(PO_4)_3$ | 67 |
| Example 4 | $TiNb_2O_7$ | $Li_{1.3}Al_{0.3}Zr_{1.7}(PO_4)_3$ | 43 |
| Example 5 | $TiNb_2O_7$ | $Li_{1.3}Al_{0.3}Zr_{1.7}(PO_4)_3$ | 30 |
| Example 6 | $TiNb_2O_7$ | $Li_{1.3}Al_{0.3}Zr_{1.7}(PO_4)_3$ | 89.5 |
| Example 7 | $TiO_2$ (B) | $Li_{1.3}Al_{0.3}Zr_{1.7}(PO_4)_3$ | 55 |
| Example 8 | $Li_4Ti_5O_{12}$ | $Li_{1.2}Ca_{0.1}Zr_{1.9}(PO_4)_3$ | 55 |
| Example 9 | $TiNb_2O_7$ | $Li_{1.3}Al_{0.3}Zr_{1.7}(PO_4)_3$ | 55 |
| Example 10 | $TiNb_2O_7$ | $Li_{1.3}Al_{0.3}Ti_{1.7}(PO_4)_3$ | 55 |
| Example 11 | $TiNb_2O_7$ | $Al_2O_3$ | 30 |
| Example 12 | $TiNb_2O_7$ | $Li_{1.3}Al_{0.3}Zr_{1.7}(PO_4)_3$ | 55 |
| Example 13 | $TiNb_2O_7$ | $Li_{1.3}Al_{0.3}Zr_{1.7}(PO_4)_3$ | 55 |
| Example 14 | $TiNb_2O_7$ | $Li_{1.3}Al_{0.3}Zr_{1.7}(PO_4)_3$ | 55 |
| Example 15 | $TiNb_2O_7$ | $Li_{1.3}Al_{0.3}Zr_{1.7}(PO_4)_3$ | 55 |
| Example 16 | Graphite | $Al_2O_3$ | 39 |
| Example 17 | Metal Li | $Al_2O_3$ | 40 |

TABLE 2

| | Composite electrolyte | | | | |
|---|---|---|---|---|---|
| | Ionic liquid | Content rate (% by weight) | Organic solvent (% by weight) | Fibrous polymer content rate (% by weight) | Average fiber diameter (nm) |
| Example 1 | $Li[N(CF_3SO_2)_2]/LiPF_6/S(C_2H_5)_3[N(CF_3SO_2)_2]$ | 40 | — | 5 | 10 |
| Example 2 | $Li[N(CF_3SO_2)_2]/LiPF_6/S(C_2H_5)_3[N(CF_3SO_2)_2]$ | 20 | — | 1 | 10 |
| Example 3 | $Li[N(CF_3SO_2)_2]/LiPF_6/S(C_2H_5)_3[N(CF_3SO_2)_2]$ | 30 | — | 3 | 10 |
| Example 4 | $Li[N(CF_3SO_2)_2]/LiPF_6/S(C_2H_5)_3[N(CF_3SO_2)_2]$ | 50 | — | 7 | 10 |
| Example 5 | $Li[N(CF_3SO2)_2]/LiPF_6/S(C_2H_5)_3[N(CF_3SO_2)_2]$ | 60 | — | 10 | 10 |
| Example 6 | $Li[N(CF_3SO2)_2]/LiPF_6/S(C_2H_5)_3[N(CF_3SO_2)_2]$ | 10 | — | 0.5 | 10 |
| Example 7 | $Li[N(CF_3SO2)_2]/LiPF_6/S(C_2H_5)_3[N(CF_3SO_2)_2]$ | 40 | — | 5 | 10 |
| Example 8 | $Li[N(CF_3SO2)_2]/LiPF_6/S(C_2H_5)_3[N(CF_3SO_2)_2]$ | 40 | — | 5 | 10 |
| Example 9 | $Li[N(FSO_2)_2]/LiPF_6/S(C_2H_5)_3[N(FSO_2)_2]$ | 40 | — | 5 | 10 |
| Example 10 | $Li[N(CF_3SO2)_2]/LiPF_6/S(C_2H_5)_3[N(CF_3SO_2)_2]$ | 40 | — | 5 | 10 |
| Example 11 | $Li[N(CF_3SO2)_2]/LiPF_6/S(C_2H_5)_3[N(CF_3SO_2)_2]$ | 60 | — | 10 | 10 |
| Example 12 | $Li[N(CF_3SO2)_2]/LiPF_6/S(C_2H_5)_3[N(CF_3SO_2)_2]$ | 40 | — | 5 | 80 |
| Example 13 | $Li[N(CF_3SO2)_2]/LiPF_6/S(C_2H_5)_3[N(CF_3SO_2)_2]$ | 40 | — | 5 | 1 |

TABLE 2-continued

| | | Composite electrolyte | | | |
|---|---|---|---|---|---|
| | Ionic liquid | Content rate (% by weight) | Organic solvent (% by weight) | Fibrous polymer content rate (% by weight) | Average fiber diameter (nm) |
| Example 14 | $Li[N(CF_3SO_2)_2]/LiPF_6/MEI[N(CF_3SO_2)_2]$ | 40 | — | 5 | 10 |
| Example 15 | $Li[N(CF_3SO_2)_2]/LiPF_6/DEME[N(CF_3SO_2)_2]$ | 40 | — | 5 | 10 |
| Example 16 | $Li[N(CF_3SO_2)_2]/LiPF_6/S(C_2H_5)_3[N(CF_3SO_2)_2]$ | 50 | VC(1) | 10 | 10 |
| Example 17 | $Li[N(CF_3SO_2)_2]/LiPF_6/S(C_2H_5)_3[N(CF_3SO_2)_2]$ | 50 | — | 10 | 10 |

TABLE 3

| | Negative electrode active material |
|---|---|
| Comparative Example 1 | $TiNb_2O_7$ |
| Comparative Example 2 | $TiNb_2O_7$ |
| Comparative Example 3 | $TiNb_2O_7$ |
| Comparative Example 4 | $TiNb_2O_7$ |
| Comparative Example 5 | Graphite |
| Comparative Example 6 | Metal Li |
| Comparative Example 7 | $TiNb_2O_7$ |
| Comparative Example 8 | $TiNb_2O_7$ |

TABLE 4

| | Composite electrolyte | | | | | |
|---|---|---|---|---|---|---|
| | Inorganic solid particles | Content rate (% by weight) | Ionic liquid or organic electrolyte solution | Content rate (% by weight) | Fibrous polymer content rate (% by weight) | Average fiber diameter (nm) |
| Comparative Example 1 | $Li_{1.3}Al_{0.3}Zr_{1.7}(PO_4)_3$ | 60 | $Li[N(CF_3SO_2)_2]/LiPF_6/S(C_2H_5)_3[N(CF_3SO_2)_2]$ | 40 | 0 | — |
| Comparative Example 2 | $Li_{1.3}Al_{0.3}Zr_{1.7}(PO_4)_3$ | 59.8 | $Li[N(CF_3SO_2)_2]/LiPF_6/S(C_2H_5)_3[N(CF_3SO_2)_2]$ | 40 | 0.2 | 5 |
| Comparative Example 3 | — | — | 1M $LiPF_6$-PC/DEC(1:2) | — | — | — |
| Comparative Example 4 | $Li_{1.3}Al_{0.3}Zr_{1.7}(PO_4)_3$ | 45 | $Li[N(CF_3SO_2)_2]/LiPF_6/S(C_2H_5)_3[N(CF_3SO_2)_2]$ | 40 | 15 | 120 |
| Comparative Example 5 | — | — | 1M $LiPF_6$-EC/DEC(1:2) + VC(1) | — | — | — |
| Comparative Example 6 | — | — | 1M $LIPF_6$-PC/DEC(1:2) | — | — | — |
| Comparative Example 7 | $Li_{1.3}Al_{0.3}Zr_{1.7}(PO_4)_3$ | 59.8 | $Li[N(CF_3SO_2)_2]/LiPF_6/S(C_2H_5)_3[N(CF_3SO_2)_2]$ | 40 | 0.2 | 10 |
| Comparative Example 8 | $Li_{1.3}Al_{0.3}Zr_{1.7}(PO_4)_3$ | 45 | $Li[N(CF_3SO_2)_2]/LiPF_6/S(C_2H_5)_3[N(CF_3SO_2)_2]$ | 40 | 15 | 10 |

TABLE 5

| | Discharge capacity at 25° C. (Ah) | Capacity retention ratio after 1000 times (%) | 5 C discharge capacity retention ratio (%) | Expansion after storage at 80° C. for 100 hours (%) |
|---|---|---|---|---|
| Example 1 | 7.0 | 90 | 80 | 5 |
| Example 2 | 7.0 | 90 | 75 | 5 |
| Example 3 | 7.0 | 90 | 82 | 5 |
| Example 4 | 7.0 | 95 | 70 | 5 |
| Example 5 | 6.8 | 94 | 65 | 5 |
| Example 6 | 6.5 | 80 | 60 | 5 |
| Example 7 | 6.3 | 80 | 80 | 8 |
| Example 8 | 6.0 | 92 | 85 | 3 |
| Example 9 | 6.8 | 85 | 70 | 6 |
| Example 10 | 7.0 | 85 | 90 | 5 |
| Example 11 | 6.5 | 80 | 60 | 8 |
| Example 12 | 6.8 | 80 | 70 | 5 |
| Example 13 | 7.0 | 90 | 94 | 5 |
| Example 14 | 6.8 | 80 | 75 | 5 |
| Example 15 | 6.8 | 80 | 70 | 7 |
| Example 16 | 5.0 | 70 | 70 | 10 |
| Example 17 | 6.0 | 60 | 60 | 5 |

TABLE 6

| | Discharge capacity at 25° C. (Ah) | Capacity retention ratio after 1000 times (%) | 5 C discharge capacity retention ratio (%) | Expansion after storage at 80° C. for 100 hours (%) |
|---|---|---|---|---|
| Comparative Example 1 | 3.0 | 10 | 10 | 5 |
| Comparative Example 2 | 3.5 | 30 | 20 | 10 |
| Comparative Example 3 | 7.0 | 70 | 60 | 20 |
| Comparative Example 4 | 5.0 | 60 | 50 | 10 |
| Comparative Example 5 | 5.0 | 40 | 60 | 15 |
| Comparative Example 6 | 5.0 | 0 | 40 | 30 |
| Comparative Example 7 | 3.4 | 20 | 15 | 10 |
| Comparative Example 8 | 5.1 | 65 | 55 | 10 |

As is clear from Tables 1 to 6, the secondary batteries of Examples 1 to 17 have a better balance of cycle life performance, discharge rate performance, and high-temperature storage performance than the secondary batteries of Comparative Examples 1 to 8. When comparing Example 1 with Comparative Examples 1, 2, 4, 7, and 8, Comparative Example 1 containing no fibrous polymer is inferior in cycle life performance and discharge rate performance. Comparative Examples 2 and 4 in which the fiber diameter of the fibrous polymer falls beyond the range of 1 to 100 nm are inferior in discharge rate performance. Comparative Example 7 in which the content of the fibrous polymer is less than 0.5% by weight is inferior to Example 1 in discharge capacity, cycle life performance and discharge rate performance. Also, Comparative Example 8 in which the content of the fibrous polymer exceeds 10% by weight is inferior to Example 1 in discharge capacity, cycle life performance and discharge rate performance.

Comparative Examples 3, 5 and 6 using the organic electrolyte solution instead of the composite electrolyte are inferior in high-temperature storage performance.

From comparison of Examples 1 to 17, it can be understood that the high-temperature storage performance of Examples 1 to 15 and 17 using a titanium-containing oxide or metallic Li as the negative electrode active material is superior to that of Example 16 using graphite as the negative electrode active material.

From comparison of Examples 1, 9, 14 and 15, it can be understood that the cycle life performance of Examples 1 and 9 containing trialkylsulfonium ions as the cations of the ionic liquid is superior to that of Example 14 containing alkylimidazolium ions as the cations of the ionic liquid and Example 15 containing quaternary ammonium ions as the cations of the ionic liquid.

The composite electrolyte of at least one of the embodiments or examples described above contains inorganic solid particles, an ionic liquid, and 0.5 to 10% by weight of a fibrous polymer having an average fiber diameter of 1 to 100 nm, and thus can realize a nonvolatile composite electrolyte having high ionic conductivity and thermal stability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A composite electrolyte comprising:
   30 to 60% by weight of inorganic solid particles;
   an ionic liquid including cations and anions;
   0.5 to 10% by weight of a fibrous polymer having an average fiber diameter of 1 to 100 nm; and
   5% by weight or less of an organic solvent,
   wherein the cations comprise trialkylsulfonium ion, and the fibrous polymer is cellulose fiber.

2. The composite electrolyte according to claim 1, comprising no polymer other than the cellulose fiber.

3. The composite electrolyte according to claim 1, wherein the inorganic solid particles are particles of a lithium ion conductive inorganic solid electrolyte.

4. The composite electrolyte according to claim 3, wherein the particles of the lithium ion conductive inorganic solid electrolyte are lithium phosphoric acid solid electrolyte particles with a NASICON type structure represented by $Li_{1+y}Al_xM_{2-x}(PO_4)_3$ (M is one or more selected from the group consisting of Ti, Ge, Sr, Zr and Ca, $0 \leq x \leq 1$, and $0 \leq y \leq 1$).

5. The composite electrolyte according to claim 1, wherein the cations of the ionic liquid further comprise alkali metal ion and at least one selected from the group consisting of alkylimidazolium ion and quaternary ammonium ion, and
   wherein the anions comprise at least one selected from the group consisting of $[N(CF_3SO_2)_2]^-$ and $[N(FSO_2)_2]^-$.

6. A secondary battery comprising:
   a positive electrode;
   a negative electrode; and
   the composite electrolyte according to claim 1, which is disposed between the positive electrode and the negative electrode.

7. The secondary battery according to claim 6, wherein the negative electrode comprises a negative electrode active material including at least one selected from the group consisting of lithium metal, carbon material, lithium titanium oxide, titanium oxide and niobium titanium oxide.

8. A battery pack comprising the secondary battery according to claim 6.

9. The battery pack according to claim 8, further comprising:
   an external power distribution terminal; and
   a protective circuit.

10. The battery pack according to claim 8, comprising plural of the secondary battery,
    wherein the secondary batteries are electrically connected in series, in parallel, or in a combination of in-series and in-parallel.

11. A vehicle comprising the battery pack according to claim 8.

12. The vehicle according to claim 11, comprising a mechanism configured to convert kinetic energy of the vehicle into regenerative energy.

13. The composite electrolyte according to claim 1, wherein the anions comprise at least one selected from the group consisting of $[N(CF_3SO_2)_2]^-$ and $[N(FSO_2)_2]^-$.

14. The composite electrolyte according to claim 1, wherein the cations further comprise alkali metal ion and the anions comprise at least one selected from the group consisting of $[N(CF_3SO_2)_2]^-$ and $[N(FSO_2)_2]^-$.

15. The composite electrolyte according to claim 1, wherein the organic solvent comprises at least one selected from the group consisting of cyclic carbonates, chain carbonates, γ-butyrolactone, α-methyl-γ-butyrolactone, phosphoric acid esters, and fluorinated ethers.

16. A composite electrolyte consisting of:
   30 to 60% by weight of inorganic solid particles;
   an ionic liquid including cations and anions; and
   0.5 to 10% by weight of a fibrous polymer having an average fiber diameter of 1 to 100 nm;
   wherein the cations comprise trialkylsulfonium ion, and the fibrous polymer is cellulose fiber.

17. The composite electrolyte according to claim 1, wherein a content of the ionic liquid in the composite electrolyte is 10 to 60% by weight.

18. The composite electrolyte according to claim 16, wherein a content of the ionic liquid in the composite electrolyte is 10 to 60% by weight.

\* \* \* \* \*